United States Patent [19]

Barnhouse

[11] Patent Number: 4,497,469
[45] Date of Patent: Feb. 5, 1985

[54] VAN ENGINE REMOVAL ASSEMBLY

[76] Inventor: Richard W. Barnhouse, 14024 Blair High Rd., Omaha, Nebr. 68134

[21] Appl. No.: 476,798

[22] Filed: Mar. 18, 1983

[51] Int. Cl.³ .............................................. B60P 1/48
[52] U.S. Cl. .................................... 254/8 B; 254/124; 254/134
[58] Field of Search ................. 269/17; 254/8 B, 124, 254/133 R, 134

[56] References Cited

U.S. PATENT DOCUMENTS 4,029,308  6/1977  Mathers ................................ 269/17

Primary Examiner—Frederick R. Schmidt
Assistant Examiner—Judy J. Hartman
Attorney, Agent, or Firm—Zarley, McKee, Thomte, Voorhees & Sease

[57] ABSTRACT

A conventional floor hoist having a removable attachment mounted thereon. The attachment comprises a swivel clamp which is removably mounted on the horizontally extending support arm of the floor hoist. A first frame member is pivotally connected at its upper end to the swivel clamp and extends downwardly therefrom. A second frame member extends forwardly from the lower end of the first frame member and has chains extending therefrom for attachment to the van engine. A length adjustable chain extends from the second frame member to the end of the support arm of the floor hoist to enable the attitude of the second frame member to be easily altered. The support arm of the floor hoist is pivotally movable by means of a hydraulic cylinder.

3 Claims, 5 Drawing Figures

VAN ENGINE REMOVAL ASSEMBLY

BACKGROUND OF THE INVENTION

It is frequently necessary to remove the engine from a van to enable the engine to be replaced or repaired. The removal of the engine from a van is extremely difficult due to the fact the van does not have the customary engine compartment. In most vans, the engine compartment extends into the interior of the vehicle between the driver and passenger seats. The conventional floor hoists which are normally used to remove engines from conventional cars and trucks are not suitable for removing engines from vans.

Therefore, it is a principal object of the invention to provide an improved apparatus for removing engines from vans.

Still another object of the invention is to provide an attachment for a conventional floor hoist which permits the removal of the van engine in a fast and convenient manner.

Still another object of the invention is to provide an attachment for a conventional floor hoist which is removably mounted thereon to permit the floor hoist to be used for other tasks.

A further object of the invention is to provide a means for removing van engines which is stable and safe to use.

These and other objects will be apparent to those skilled in the art.

SUMMARY OF THE INVENTION

A means is disclosed to enable the convenient removal of the engine from a van. The means of this invention comprises an attachment which is removably mounted on a conventional floor hoist. The attachment comprises a swivel clamp which is removably mounted on the horizontally extending support arm of the floor hoist. A first frame member is pivotally connected at its upper end to the swivel clamp and extends downwardly therefrom. A second frame member extends forwardly from the lower end of the first frame member and has a chain means extending from its free end for attachment to the van engine. A length adjustable chain means extends from the second frame member to the end of the support arm of the floor hoist to enable the attitude of the second frame member to be easily altered.

DESCRIPTION OF THE PREFERRED EMBODIMENT

Figure 1:
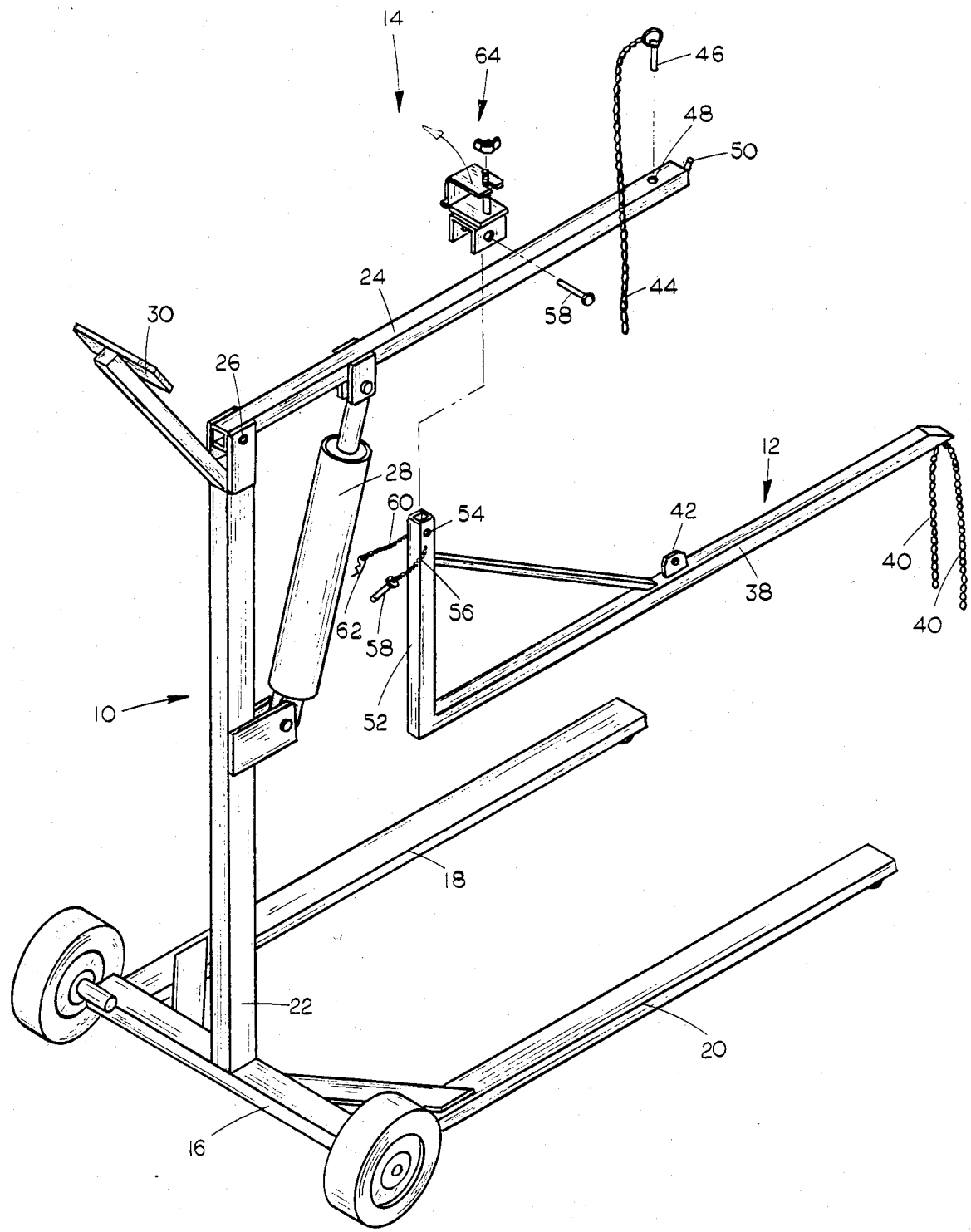
FIG. 1 is a perspective view illustrating the van engine removal assembly of this invention.
Figure 2:
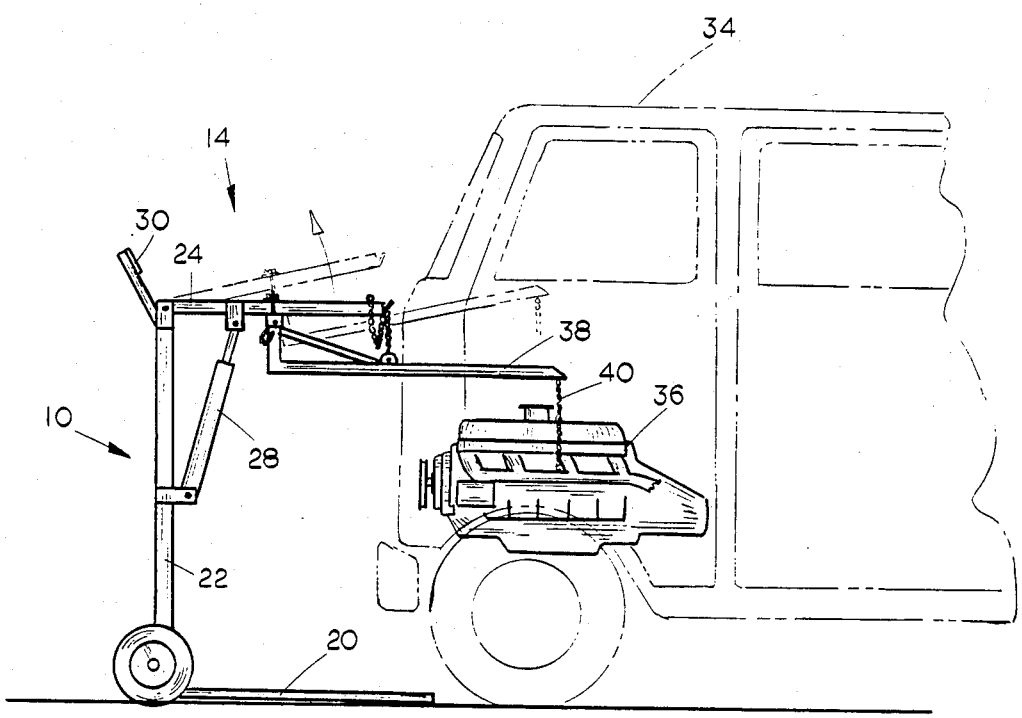
FIG. 2 is a side view illustrating the invention being used to remove the engine from a van.
Figure 3:
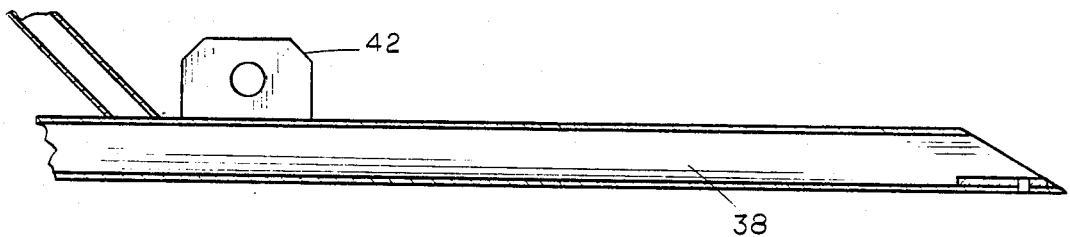
FIG. 3 is a longitudinal sectional view of the assembly support arm.
Figure 4:
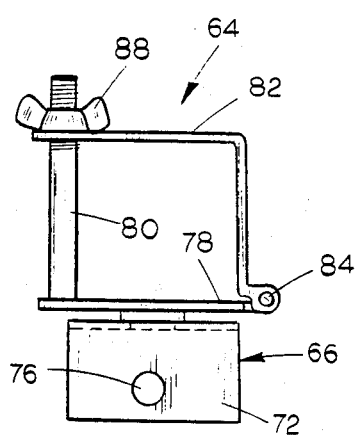
FIG. 4 is a side view of the swivel clamp of the invention.
Figure 5:
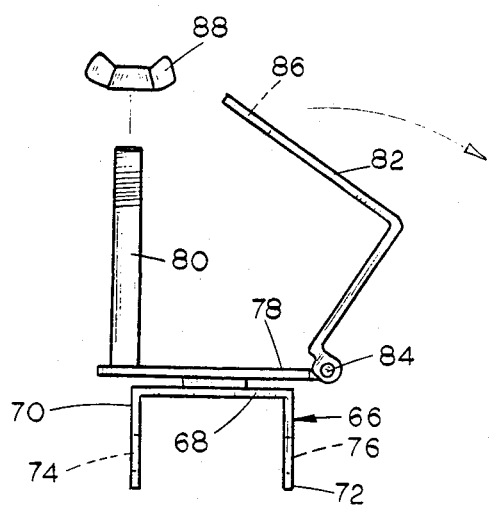
FIG. 5 is a view similar to that of FIG. 4 except that the clamp has been opened and the lower portion thereof has been rotated 90°.

The numeral 10 refers generally to a conventional floor hoist while the numeral 12 refers to the attachment which is secured thereto to provide the van engine removal assembly 14. Floor hoist 10 comprises a wheeled frame 16 having a pair of floor engaging stabilizer arms 18 and 20 extending therefrom. Post 22 extends upwardly from wheeled frame 16 and has an elongated support arm 24 pivotally mounted thereto at 26. A hydraulic cylinder 28 extends between post 22 and arm 24 to enable the arm 24 to be selectively raised and lowered in conventional fashion. The numeral 30 refers to a handle assembly or the like which is employed by the operator to steer or otherwise control the movement of the floor hoist 10. The conventional floor hoist 10 is ideally suited for use with conventional cars and trucks but is not suited for use in the removal of an engine from a van since the end of the arm 24 is limited in its rearward travel by the forward portion of the van 34. It is to this conventional structure that the attachment 12 is mounted to enable the engine 36 to be removed from the van 34 as illustrated in FIG. 2.

Attachment 12 comprises an elongated frame member 38 having a chain 40 secured to the outer end thereof. Bracket 42 extends upwardly from frame member 38 as illustrated in the drawing and has one end of the chain 44 secured thereto by any convenient means. The other end of chain 44 has a pin 46 mounted thereon which is adapted to be received by the opening 48 in the outer end of arm 24. Hook 50 is provided on the outer end of arm 24 for a purpose to be described in more detail hereinafter.

Frame member 52 extends upwardly from the inner end of frame member 38 and has an opening 54 formed therein at its upper end. Chain 56 is secured to frame member 52 and has pin 58 mounted on the free end thereof. Chain 60 is also secured to frame member 52 and has a quick release cotter key 62 mounted on the free end thereof which is adapted to be received by pin 58.

The numeral 64 generally identifies a swivel clamp connection which detachably secures the upper end of frame member 52 to the arm 24. Swivel clamp 64 includes a channel-shaped member 66 including base 68 and downwardly depending legs 70 and 72 which are provided with openings 74 and 76 therein, respectively. Base 68 is rotatably secured to plate 78 which has bolt 80 extending upwardly from one end thereof. Latch plate 82 is hingedly secured to plate 78 and at 84 and has an opening 86 at one end thereof which is adapted to receive bolt 80 when the latch plate is in its closed position. The numeral 88 refers to a conventional wing nut adapted to be threadably mounted on bolt 80.

When the attachment 12 is not mounted on the floor hoist 10, the floor hoist may be used in its conventional manner. When it is desired to remove the engine from a van, the attachment 12 is secured thereto in the following manner. Swivel clamp 64 is secured to arm 24 by removing wing nut 88 from bolt 80 and pivotally opening the latch plate 82 to its open position. Arm 24 is then positioned between the bolt 80 and the latch plate 82 and the latch plate 82 is then moved to its closed position with the wing nut 88 being threadably secured to the bolt 80.

The upper end of frame member 52 is then positioned between the legs 70 and 72 so that the opening 54 in frame member 52 is aligned with the openings 74 and 76. Pin 58 is then extended to the openings 76, 54 and 74. Cotter key 62 is then extended through the outer end of the pin 58 to provide a secure and safe connection. Pin 46 on chain 44 is then extended through opening 48. One link of the chain 44 is then extended over the hook 50 as illustrated in FIG. 2 so that the desired positioning of frame member 38 is achieved.

The entire assembly 14 is then moved into position with respect to the van 34 as illustrated in FIG. 2 so that the frame member 38 extends inwardly into the engine compartment over the engine 36. It should be noted in FIG. 2 that the radiator and other structure at the forward portion of the van have been removed to facilitate the removal of the engine. The chains 40 are then secured to the engine by any convenient means such as head bolts, manifold bolts, etc. If chain 44 had not been previously connected, the frame member 38 is then pivotally moved upwardly to place tension on the chains 40 and the chain 44 is then connected to the hook 50. Hydraulic cylinder 28 on the floor hoist is then operated to pivotally move the support arm 24 upwardly to the position illustrated by broken lines in FIG. 2 which causes the engine 36 to be moved upwardly from its mounts. When the engine 36 has been raised sufficiently, the entire assembly is then rolled away from the front of the van 34 with the engine 36 being supported by the chains 40 during such movement.

Thus it can be seen that a novel assembly has been provided which permits the convenient removal of an engine from a van which is not otherwise possible with a conventional floor hoist. The attachment 12 is easily and conveniently secured to the floor hoist and has the necessary adjustments to permit the engine to be removed in a convenient fashion. The swivel connection between frame member 52 and the support 54 permit the outer end of the frame member 38 to be moved laterally somewhat to permit the frame member 38 to be positioned in the desired location.

Thus it can be seen that the assembly of this invention accomplishes at least all of its stated objectives.

I claim:
1. In combination,
a floor hoist comprising a wheeled frame means and having at least one floor engaging stabilizer arm extending therefrom, an upstanding post means, an elongated support arm, having first and secondary ends, pivotally secured at its first end, about a horizontal axis, to said post means adjacent the upper end thereof and extending therefrom above said stabilizer arm, and means for selectively pivotally moving said support arm upwardly and downwardly relative to said post means,
and a van engine removal assembly secured to said support arm,
said assembly comprising a first frame member having upper and lower ends and being secured at its upper end to said support arm between the ends thereof, and an elongated second frame member extending from the lower end of said first frame member beyond the second end of said support arm, said second frame member having an outer end positioned outwardly of said second end of said support arm, said second frame member being positioned below said support arm and generally parallel thereto,
support means extending from said support arm, adjacent its second end, to said second frame member intermediate the length thereof,
means on the outer end of said second frame member for attachment to the van engine,
and a swivel means connecting the upper end of said first frame member to said support arm.

2. The floor hoist of claim 1 wherein said support means comprises a length adjustable chain means.

3. The floor hoist of claim 1 wherein said assembly is removably secured to said floor hoist.

* * * * *